(12) United States Patent
Kukreja et al.

(10) Patent No.: US 10,366,142 B2
(45) Date of Patent: Jul. 30, 2019

(54) IDENTIFIER BASED GLYPH SEARCH

(71) Applicant: Adobe Inc., San Jose, CA (US)

(72) Inventors: Dinesh Kukreja, Noida (IN); Manish Jangir, Noida (IN); Mohammad Javed Ali, Noida (IN); Mrinalini Sardar, Noida (IN); Sameer Manuja, Ghaziabad (IN); Vineet, Noida (IN); Vivek Ranjan, Noida (IN)

(73) Assignee: Adobe Inc., San Jose, CA (US)

(*) Notice: Subject to any disclaimer, the term of this patent is extended or adjusted under 35 U.S.C. 154(b) by 357 days.

(21) Appl. No.: 15/148,785

(22) Filed: May 6, 2016

(65) Prior Publication Data
US 2017/0323007 A1 Nov. 9, 2017

(51) Int. Cl.
*G06F 16/30* (2019.01)
*G06F 17/21* (2006.01)
*G06F 16/58* (2019.01)

(52) U.S. Cl.
CPC ............ *G06F 17/214* (2013.01); *G06F 16/58* (2019.01)

(58) Field of Classification Search
CPC ............................... G06F 16/58; G06F 17/214
See application file for complete search history.

(56) References Cited

U.S. PATENT DOCUMENTS

| 5,778,361 A * | 7/1998 | Nanjo ............... G06F 17/30622 |
| 6,426,751 B1 * | 7/2002 | Patel ..................... G06F 17/214 345/468 |
| 2012/0092345 A1 * | 4/2012 | Joshi ..................... G06F 17/214 345/471 |
| 2017/0132484 A1 * | 5/2017 | Malon .................. G06K 9/2081 |

* cited by examiner

*Primary Examiner* — Tarek Chbouki
(74) *Attorney, Agent, or Firm* — SBMC

(57) ABSTRACT

An identifier based glyph search is described. In one or more embodiments, a search input is analyzed in a digital medium environment to generate search tokens and locate a font. The search tokens are compared to identifiers within the font, and corresponding identifiers are used to locate and retrieve particular glyphs from within the font. The retrieved glyphs are ordered and configured for output or display. The resulting glyph results include a variety of glyphs that are related to the search input, and may provide alternative related glyphs even where a user knows an exact identifier associated with a glyph. This technique may be iterated to accommodate changing search inputs and allows users to easily find desired glyphs with minimal effort and without the need for specialized knowledge regarding the identifiers of particular glyphs.

20 Claims, 13 Drawing Sheets

IDENTIFIER BASED GLYPH SEARCH

BACKGROUND

Fonts are digital files or code that represent instances of digital typefaces. Examples of typefaces include Arial, Courier, Helvetica, and Times New Roman. An example of a font is a digital file (e.g., "Helvetica.otf") that represents a style of a typeface, such as Helvetica. A given font or family of fonts can have options for different point sizes, various effects such as bold or italics, and so forth. Every font provides a number of glyphs that are visual representations of abstract characters. As an example, the letter "a" is an abstract character which can be visually represented in any number of ways through different glyphs of the letter "a".

Storage of electronic text as glyphs of a particular font results in large file sizes with little flexibility or compatibility between different applications or devices. Accordingly, electronic text is typically stored as characters rather than glyphs and is independent of any particular font. A font allows a computing application to translate electronic text from characters into glyphs for display within an application. For example, a web browser of a smart phone can display text from a web page using a font stored locally on the smart phone, while a web browser of a desktop computer can display text from the same web page using a font stored locally on the desktop computer.

A variety of fonts have been created to accommodate the diversity of stylistic preferences of people around the world. The variety of fonts, for instance, enable people of different languages and cultures to enjoy electronic text in their own way. For example, a restaurant specializing in middle eastern cuisine may want to create menus that appear Arabic despite having English speaking customers. The font "Faux Arabic Regular" can fill this need, as it presents Latin characters with glyphs that capture the style and "feel" of Arabic calligraphic script while remaining legible in the English language. Further, a designer of wedding invitations might want text to appear "fancy and elegant" and utilize the font "Palace Script MT," while a designer of children's books might want text to appear "fun" and utilize the font "Jokerman." Thus, a user may select a font based on their individual stylistic preferences.

A single font, however, may by itself also allow for a diverse range of stylistic preferences. For instance, the single font may include more glyphs than characters, such as by including multiple alternative glyphs to represent the same character or including ligature glyphs that may represent multiple characters with a single glyph. To accommodate this, a definition of a font may include not only an explanation of how individual characters are formed, but also an explanation of how each character relates to or interacts with other characters based on the chosen glyphs. However, it is common for a font to contain glyphs which are only accessible when manually selected by a user from a list of the glyphs. As an example, a font may include a glyph for the Greek character Omega yet the English keyboard does not include an input for Omega, or a font may include five glyphs for a single letter but by default only uses the first of these five glyphs. To select the Omega glyph or any of the four alternate glyphs for the letter, a user must search through every single glyph within the font and locate the desired glyph. Further, glyphs may be listed in no particular order and similar glyphs are often not grouped together. Accordingly, a search for five different glyphs of the same letter may entail searching for five completely different locations within a list of glyphs. As there may be an immense number of glyphs within a font, this process may take an extended period of time and be considered tedious. As another example, a user may be searching for a glyph of the Greek letter "Omega" but does not know that the glyph's exact name is "Greek Capital Letter Omega." Using traditional methods, merely knowing that the glyph is for "Omega" is insufficient to locate the glyph, and the user must manually search through every single glyph within the font until they have visually located the desired glyph. Accordingly, it can be difficult, inconvenient, and time-consuming to locate a particular glyph within a font.

SUMMARY

An identifier based glyph search is described. In one or more embodiments, the identifier based glyph search provides a convenient approach for locating particular glyphs from within a font. In at least some embodiments, a search input is analyzed to generate search tokens. The search tokens are compared to identifiers within a font, and corresponding identifiers are used to locate and retrieve particular glyphs from within the font. The retrieved glyphs are ordered and configured for output or display. The resulting glyph search result may include a variety of glyphs that are related to the search input, and may provide alternative related glyphs.

By creating search tokens that are comparable to identifiers within a font, glyphs may be located using natural or intuitive search terms rather than strictly requiring exact name or Unicode values. For instance, a user may know a partial identifier but does not know the complete identifier for a glyph. By creating search tokens based on the partial identifier, the identifier based glyph search may locate complete identifiers and thereby locate the desired glyph. Further, the creation of search tokens allows the identifier based glyph search to search multiple types of identifiers with a single input. For instance, in the case of a textual search query, the identifier based glyph search may create search tokens of the textual input for use in searching name identifiers, and may additionally create search tokens of the Unicode values for each character of the textual input for use in searching Unicode identifiers.

These techniques help users to not only find a desired glyph but may also suggest other glyphs which fall into a similar category, as the user may not know identifiers of the related glyphs. For example, a user may be searching for a glyph of a lower case character but can only remember an identifier of a glyph of a corresponding upper case character. By utilizing the techniques described herein of creating search tokens for comparison with identifiers in a font, the user may simply search using the identifier of the glyph of the upper case character and be provided with the related glyph of the lower case character. Further, these techniques may allow users to locate glyphs that the user was not aware existed. For instance, a user may be searching for a ligature glyph of two characters without knowing that a ligature glyph exists that additionally includes a third character. The identifier based glyph search may locate the related ligature glyph of three characters and expose the related glyph to the user.

These techniques may also be iterated to accommodate changing search inputs, such as by updating the glyph search result each time a character is entered into or deleted from a search input field. This may be very useful to a user, such as when a user has a mistaken belief as to the identifier of a glyph. For instance, each additional character included in a query of the search input may result in a narrowing of the displayed search results. As the number of search results decrease, a user may be able to identify their desired glyph prior to inputting a complete identifier and thus saving time, or may be able to identify where a mistake has occurred, such as a typographical error or misspelling of a query. By iterating the technique as the input changes, the user may easily find desired glyphs with minimal effort, even where the user may not know the exact identifiers associated with their desired glyph.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is presented with reference to the accompanying figures. In the figures, the left-most digits of a reference number identify the figure in which the reference number first appears. The use of the same reference numbers in different instances in the description and the figures may indicate similar or identical items. Entities represented in the figures may be indicative of one or more entities, and thus reference may be made interchangeably to single or plural forms of the entities in the discussion.

DETAILED DESCRIPTION

Overview

Figure 1:
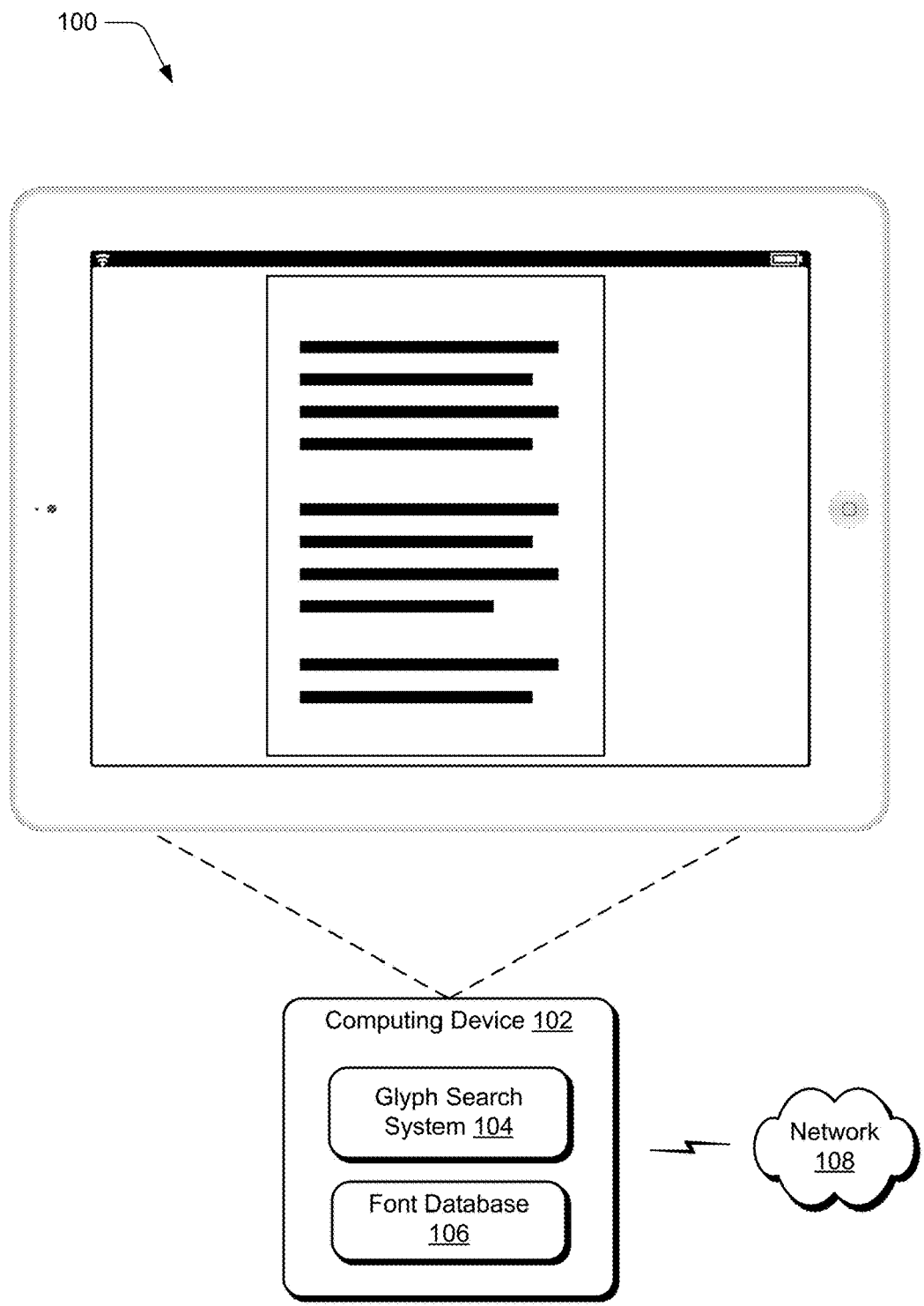
FIG. 1 is an illustration of an environment in an example embodiment that is operable to employ techniques described herein.

Techniques and systems for an identifier based glyph search are described. The identifier based glyph search provides a convenient approach for locating particular glyphs from within a font. A user, for instance, may input partial values to locate a variety of related glyphs without knowing the full or exact value of an identifier of a glyph. Additionally, the glyph search system supports glyph searches on the basis of Character Identification ("CID") values and Glyph Identification ("GID") values. These techniques help users to not only find a desired glyph but may also suggest other glyphs which fall into a similar category, as the user may not know identifiers of the related glyphs or may not even be aware of the existence of the related glyphs.

A glyph search system is employed in the following that takes and processes a search input to locate glyphs related to the search input, if available. The search input may be configured to include a query, a font, and a search type. For instance, the query may be any user specified query, the font may be a font the user desires to search within, and the search type may indicate a method the user wishes to use to search such as search by Name, search by Unicode value, search by CID, search by GID, and so forth. The glyph search system is then used to analyze the search input, search a font corresponding to the font indicated in the search input, and configure a glyph search result for output.

In order to do so, the glyph search system may be configured as a pipeline formed as a series of modules to process the input. A first module in this pipeline includes an analyzing module used to analyze the search input and generate search tokens based on the query. For example, the search input may include a query of "ffb", may indicate the font "Times New Roman", and may indicate to "Search by Unicode value." The analyzing module may be configured to generate search tokens containing Unicode value strings representing all or part of the query. Continuing the example, the analyzing module may generate a search token containing the Unicode values of the query "ffb," such as the search token "0066+0066+0062."

The glyph search system then locates a font indicated by the search input, through use of a searching module. In the current example, the search input indicated the font "Times New Roman," so the searching module locates a locally-stored font of "Times New Roman." The font contains glyphs and identifiers associated with the glyphs. The identifiers allow each glyph to be differentiated one from another, or to be properly identified as corresponding to their respective characters. The searching module may search the identifiers by comparing the search tokens with each identifier to locate a full or partial match. For instance, an identifier may exactly match a search token, or an identifier may include or begin with a search token. Continuing the above example, the searching module may search for identifiers that exactly match "0066+0066+0062" and may also search for identifiers that begin with the string, such as "0066+0066+0062+0062." Once matching identifiers have been located, the searching module retrieves the glyphs associated with the matching identifiers.

The glyph search system may then configure a glyph search result through use of a result configuration module. As the searching module may have retrieved many glyphs including related glyphs, a useful order may be ascertained in which to present the located glyphs to a user such that the user. For example, the result configuration module may present exact matches before related matches so as to not frustrate a user searching for particular glyphs with an input of an exact identifier. Once the glyphs are ordered, the result configuration module may configure the ordered glyphs for output or display such as by displaying a glyph search result on the screen of a user device, exposing the located glyphs for placement in an application on the user device, and so forth.

These techniques may iterate to accommodate changing search inputs, such as to update the glyph search result each time a character is entered into or deleted from a search input field. This may be useful to a user, such as when a user has a mistaken belief as to the identifier of a glyph. For instance, each additional character included in a query of the search input may result in a narrowing of the displayed search results. As the number of search results decrease, a user may be able to identify a desired glyph prior to input of a complete identifier and thus save time, or may be able to identify where a mistake has occurred, such as a typographical error or misspelling of a query. For example, a user may be searching for the glyph "™" with the intention of searching with the query "trademark." However, the name of the "™" glyph is "Trade Mark Sign" and a search of "trademark" may not locate the desired glyph. In this example, the user is able to see that the glyph is present for a search of "trade" but not "tradem" and is able to correct the query and thereby locate the glyph, where a single search for "trademark" would have left the user unable to locate the glyph. By iterating the technique as the input changes, the user may find desired glyphs with minimal effort, even where the user may not know exact identifiers associated with a desired glyph.

In this way, the glyph search system may locate glyphs related to a search input without requiring a matching or complete identifier as a search input. Thus, the glyph search system avoids the limitations of conventional glyph searching techniques in which a user must know the exact name or Unicode value of the glyph they are searching for.

The glyph search system may be configured in a variety of ways, such as a third-party module configured for inclusion in one or more applications being developed, as part of a stand-alone application, implemented as a web service, and so forth.

In one or more embodiments, the term "font", as used herein, may refer to a digital representation of a typeface and glyphs associated with the typeface. For example, a font may be a digital file, e.g. "Helvetica.otf". Additionally, the term "font" may collectively refer to a family of fonts, for example, the Helvetica font might include a plurality of digital files such as "Helvetica.otf", "Helvetica-bold.otf", "Helvetica-thin.otf" and so forth. The term "glyph", as used herein, may refer to a physical shape or form that is perceivable by the human eye and connotes a corresponding character. The term "identifier," as used herein, may refer to any information helpful in identifying a glyph, for example, a name value, a Unicode value, a CID value, a GID value, and so forth.

Further discussion of these and other examples is included in the following sections. In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example embodiment that is operable to employ techniques described herein. The illustrated environment 100 includes a computing device 102 having a processing system that may include one or more processing devices (e.g., processors) and one or more computer-readable storage media. The illustrated environment 100 also includes a glyph search system 104 embodied on the computer-readable storage media and operable via the processing system to implement corresponding functionality described herein, and a font database 106. In at least some embodiments, the computing device 102 may include functionality to access web-based resources (e.g., content and services), browse the Internet, interact with online providers, and so forth as described in further detail below, such as through a network 108.

The computing device 102 may be configured as any suitable type of computing device. For example, the computing device 102 may be configured as a desktop computer, a laptop computer, a mobile device (e.g., assuming a handheld configuration such as a tablet or mobile phone as illustrated), a tablet, a device configured to receive gesture input, a device configured to receive three-dimensional (3D) gestures as input, a device configured to receive speech input, a device configured to receive stylus-based input, a device configured to receive a combination of those inputs, and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 13.

The computing device 102 may further communicate with one or more service providers over the network 108, such as the Internet, to provide a "cloud-based" computing environment. Generally speaking, a service provider is configured to make various resources available over the network 108 to clients. In some scenarios, users may sign up for accounts that are employed to access corresponding resources from a provider. The provider may authenticate credentials of a user (e.g., username and password) before granting access to an account and corresponding resources. Other resources may be made freely available, (e.g., without authentication or account-based access). The resources can include any suitable combination of services and/or content typically made available over a network by one or more providers. Some examples of services include, but are not limited to, photo editing services, image illustrating services, photo printing services (e.g., Snapfish®, Shutterfly®, and the like), photo store and/or sharing services (e.g., Flickr®), social network services (e.g., Facebook®, Twitter®, Instagram®, and the like), and so forth.

The computing device 102 is illustrated as including a glyph search system 104. The glyph search system 104 is representative of logic implemented at least partially in hardware to search a font database 106, e.g., through use of a processing system, computer-readable storage media, integrated circuits, and so on as further described in relation to FIG. 13. The glyph search system 104, for instance, may locate glyphs to display in a user interface of an illustrated display device of the computing device 102 for viewing by a user. Although the glyph search system 104 is illustrated as being implemented by the computing device 102, functionality represented by the glyph search system 104 may also be implemented in whole or in part "in the cloud" as represented by the network 108 and also further described in relation to FIG. 13.

The font database 106 refers to a location, entity, module, service, device, or combination thereof that has access to multiple fonts. A "font" refers to a digital representation (e.g., a file or some code) of a typeface and glyphs associated with the typeface. Examples of typefaces include Times New Roman, Helvetica, Calibri, Britannic Bold, and Courier New. Historically, each typeface was one particular point size because letters were made from individual physical stamps. In modern digital environments, however, a font can include or be usable to produce characters at many different point sizes. A font may also be considered to include style variations or effects, such as italics or bold. Alternatively, different point sizes and different variations may be packaged as separate fonts and considered collectively as a family of fonts.

Each font within the font database 106 associates characters with glyphs. A "character" refers to the concept or abstraction of a unit of text. Examples of characters include a letter of an alphabet, a symbol, an ideograph, punctuation, an emoji, a logogram, or any other human-readable or interpretable form that can be represented as text using a computing device. A "glyph" refers to a physical shape or form that is perceivable by the human eye and connotes the corresponding character. A glyph is specific to how a particular font renders the glyph, but a character transcends multiple fonts. For instance, the letter "a" is a concept, and may be visually represented in any number of ways through different glyphs of the letter "a". A computing device renders a glyph on a display screen or on a physical hard copy.

The various fonts contained within the font database 106 may additionally refer to instructions or other information usable to generate or render characters in the corresponding font, such as instructions for a vector-based incarnation of glyphs contained in the font. A font may also describe how one glyph interacts with one or more other glyphs with regard to spacing between two glyphs, combining two characters into a single glyph (i.e. ligatures), and so forth. Thus, a font contains the information needed to convert abstract characters into a physical shape or form that is perceivable by the human eye and connotes the corresponding characters.

The network 108 is a network via which the computing device 102 can communicate with other connected entities, such as one or more additional computing devices, servers, and so forth. Although the network 108 is illustrated as the Internet, the network may assume a wide variety of configurations. For example, the network 108 may include a wide area network, a local area network, a wireless network, a public telephone network, an intranet, and so on. Further, although a single the network 108 is shown, the network 108 may be representative of multiple networks.

The glyph search system 104 may be implemented as a software module, a hardware device, or using a combination of software, hardware, firmware, fixed logic circuitry, etc. Further, the glyph search system 104 may be implemented as a standalone component of the computing device 102 as illustrated. In addition or alternatively, the glyph search system 104 may be configured as a component of an application, an operating system of the computing device 102, a plug-in module, a standalone service or a service integrated with other services, or other device application.

In at least some embodiments, the glyph search system 104 is configured to operate in connection with content editing applications that may use application-specific and/or proprietary formats. By way of example and not limitation, one of the applications may be configured as a publishing application, one example of which is Adobe InDesign® CC. Other content and image editor applications are also contemplated.

Having considered an example environment, consider now a discussion of some example details of the techniques for the identifier based glyph search in accordance with one or more embodiments.

Identifier Based Glyph Search

Figure 2:
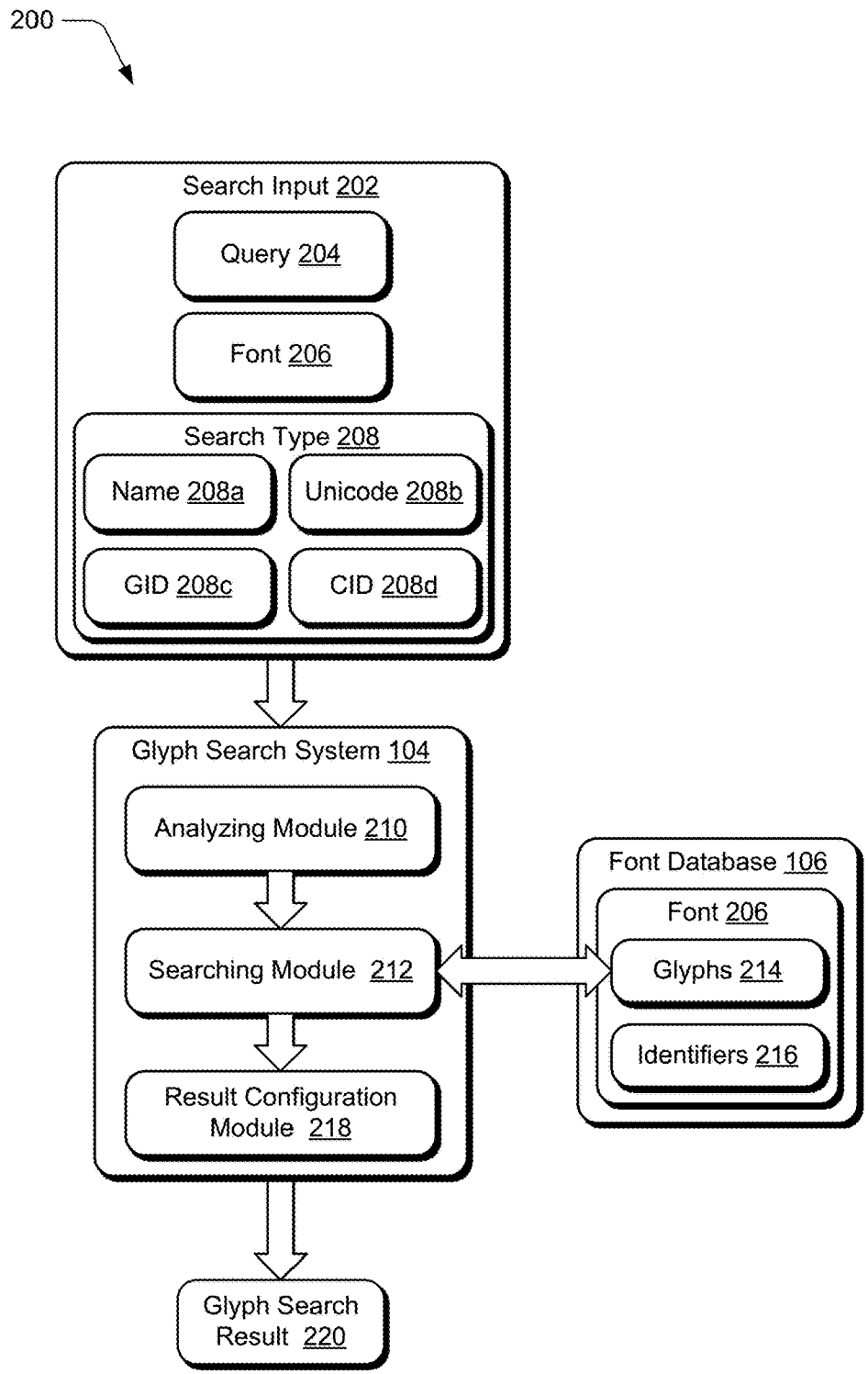
FIG. 2 depicts a system in an example embodiment in which a glyph search system searches a font database for glyphs.

This section describes some example details of an identifier based glyph search in accordance with one or more embodiments. FIG. 2 depicts an example embodiment showing the glyph search system 104 of FIG. 1 implemented as a pipeline formed using a plurality of modules. To begin, the glyph search system 104 is illustrated as receiving a search input 202 specifying a query 204, a font 206, and an indication of a search type 208. The search input 202, for instance, may be formed as a series of individual inputs. The inputs may originate in a variety of ways, such as detected using touchscreen functionality of a display device, use of a cursor control device or stylus, detected using a camera and without using touch as part of a natural user interface, use of a keyboard, and so forth. The query 204 may be a text query consisting of characters. The font 206 may be specified by a user, or alternatively may be determined by an application or inferred from the operating context of a user device. For example, an application in which the search input is generated may detect that an active document within the application is rendered using a specific font, and may automatically select that specific font or otherwise include it within the search input 202. The search input 202 may specify additional information, including the search type 208 such as an indication of a scope of the search, e.g. search by Name 208a, search by Unicode value 208b, search by Character ID 208c, search by Glyph ID 208d, and so forth.

The search input 202 in this example is first processed by an analyzing module 210 of the glyph search system 104. The analyzing module 210 is representative of logic implemented at least partially in hardware (e.g., as a processing system and computer-readable storage medium, integrated circuit, and so on as described in relation to FIG. 13) to analyze inputs based on one or more factors. This analyzing, for instance, may determine and generate search tokens to be used by a searching module 212 in searching the font database 106. A variety of factors may be used as a basis of this determination, examples of which include an indicated scope of the search (e.g. name, Unicode value, CID, GID, and so forth) and the format of the query 204. For instance, the analyzing may be performed differently for a search input indicating to search by name compared to a search input indicating to search by CID, and the analyzing may be performed differently for a search input with a query of a single character compared to a search input with a query of multiple characters.

In the case where the search input 202 specifies the search type 208 of search by Name 208a, the analyzing module 210 determines a length of the query 204. If the length of the query 204 is one character, the analyzing module 210 generates a search token of the of the character, and generates an additional search token of the of the other case of the character (i.e. upper case and lower case) if such character exists. For example, for a query of "a", the analyzing module 210 may create a search token "0061", the Unicode value of "Latin Small Letter A", as well as a search token "0041", the Unicode value of "Latin Capital Letter A". If the text length of the query 204 is greater than one character, the analyzing module 208 creates a search token of the characters of the query 204, and creates a token of the characters of each individual word of the query 204. For example, for a query of "small letter a", the analyzing module 210 may create the search tokens "small letter a", "small", "letter", and "a". The search tokens may be expressed as strings of Unicode values, or through any suitable means such as binary or ASCII representations of characters. Characters of the query 204 may be separated into words based on the inclusion and location of one or more "space" characters in the query. For the purposes of this separation into words and generation of tokens discussed herein, any characters) separated by "space" characters from other characters will be considered a word.

In the case where the search input 202 specifies the search type 208 of search by Unicode value 208b, search by GID 208c, and/or search by CID 208d, the analyzing module 210 determines if the query 204 is a numerical input. If the query 204 is a numerical input, the analyzing module 210 generates a search token of the number of the query. The numerical input need not be a decimal input, and may be a hexadecimal input or a number in any suitable base. The search token may contain, for instance, a string of Unicode values or any other encoding representative of the numerical input. If the query 204 is not a numerical input, the analyzing module 210 may convert the input into a numerical input, such as by converting a text input into Unicode values of the text. For example, if the search input 202 specifies the query 204 of "ffb" and the search type 208 of search by Unicode value 208b, the analyzing module 210 may generate a search token containing the Unicode values of the query "ffb," such as the search token "0066+0066+0062." If the search input indicates to search by "all" or otherwise fails to specify a search type, the analyzing module 210 may operate in a manner as to include each technique as described above with respect to search by Name 208a, search by Unicode value 208b, search by GID 208c, and/or search by CID 208d.

The searching module 212 is illustrated as receiving the search tokens from the analyzing module 210. The searching module 212 is representative of logic implemented at least partially in hardware (e.g., as a processing system and computer-readable storage medium, integrated circuit, and so on as described in relation to FIG. 13) to search the font database 106 for glyphs 214. This searching, for instance, may compare the search tokens with identifiers 216 within the font 206. The identifiers 216 are information associated with the glyphs 214, as described below. A variety of factors may be used as a basis of this search, such as an indicated scope of the search (e g name, Unicode value, CID, GID, and so forth). For instance, if the search input indicates to search by Name 208a, the searching module 212 might search only the name values within the identifiers 216, while if the search input indicates to search by GID 208c, the searching module 212 may optionally search only the GID values within the identifiers 216. The searching module 212, upon locating qualifying identifiers, retrieves from the font 206 the glyphs associated with the qualifying identifiers.

The identifiers 216 for each respective glyph of the glyphs 214 may include any information helpful in identifying a glyph, for example a name value, a Unicode value, a CID value, a GID value, and so forth. A Unicode value is a computing industry standard for consistent representation of characters, used to associate glyphs with common characters in a uniform manner A name value is a description given to a glyph, and if the glyph corresponds to a Unicode character, the name is typically a uniform name assigned to the Unicode character. A GID is an arbitrary number assigned to each glyph by the creator of the font, and may differ drastically from font to font. A CID is a value often utilized with glyphs for East Asian languages. Unicode supports Chinese, Japanese, and Korean "CJK" characters as a single set of CJK encodings based on the Chinese Han ideographs.

However, many CJK characters take different forms depending on the language and locale. For example, the Unicode Han Character "straight, erect, vertical" represented with the Unicode value "76F4" is distinct enough between the Chinese and Japanese glyphs that a reader of Japanese may be unable to recognize the character "straight, erect, vertical" when retrieved utilizing its Unicode value. Thus, many users in East Asian locales prefer identifiers such as the CID which can provide glyphs recognizable in their own language.

Unicode supports a small set of ligatures directly, however many common ligatures are not assigned Unicode values. An application or font may include instructions to replace a sequence of values with a ligature. For example, a font or application may include instructions that "f" followed by "f" is to be replaced with a glyph of an "ff" ligature. The searching module 212 can search these instructions to locate strings associated with ligatures, and for the purposes of the techniques described herein a ligature is considered to have a value corresponding to the string of values the ligature represents or is associated with.

In the case where the search input 202 specifies the search type 208 of search by Name 208a, the searching module 212 searches the identifiers 216 for name values that contain one or more of the search tokens. The searching module 212 may employ additional criteria in retrieving the glyphs 214 as well. For instance, the searching module 212 may search using search tokens derived from separate words of the input, and may optionally require that the identifier 216 contain each of the search tokens. To continue a previous example above, the analyzing module 210 may have created search tokens of "small letter a", "small", "letter", and "a" in response to a query of "small letter a". The searching module 212 may search for an identifier that contains "small letter a" and may additionally search for an identifier that contains all three of "small", "letter", and "a".

In the case where the search input 202 specifies the search type 208 of search by Unicode value 208b, search by GID 208c, or search by CID 208d, the searching module 212 searches the identifiers 216 for Unicode, GID, or CID values, respectively, that contain one or more of the search tokens. The searching module 212 may employ additional criteria in retrieving glyphs as well. For instance, the searching module 212 may optionally require that the identifier 216 begin with, and not merely contain, the one or more search tokens.

The searching module 212 may employ any suitable algorithm to locate the identifiers. For example, if the search token is 'x', a Unicode value (or any hexadecimal value), the searching module 212 can locate all glyphs 'g' for which the following criteria is met:

$$(\text{identifier of } g)/(16^k) = x$$

where k is an integer value greater than 0 and the identifier of g is likely a Unicode value. Likewise, if the search token is 'y', a decimal value, the searching module 212 can locate all glyphs 'g' for which the following criteria is met:

$$(\text{identifier of } g)/(10^k) = y$$

where k is an integer value greater than 0, and the identifier of g is likely a GID or CID of g.

In the case where the search input 202 specifies to search by "all" or otherwise fails to specify a search type, the searching module 212 may combine and perform the above techniques simultaneously or near-simultaneously, performing all or some of the techniques described for each of the search types 208 of search by Name 208a, search by Unicode value 208b, search by GID 208c, and search by CID 208d.

A result configuration module 218 is illustrated as receiving the located glyphs from the searching module 212. The result configuration module 218 is representative of logic implemented at least partially in hardware (e.g., as a processing system and computer-readable storage medium, integrated circuit, and so on as described in relation to FIG. 13) to configure the located glyphs for output or display. This configuration, for instance, may consider the conditions under which each particular glyph was located with respect to the search input.

For instance, in the case where the search input 202 indicates to search by Name 208a, the result configuration module 218 may configure the glyphs to display in the following order:
1. Glyphs that exactly match the Unicode value of the query
2. Glyphs that exactly match the Unicode value of the alternate case of the query
3. Ligatures including the query
4. Ligatures including the alternate case of the query
5. Glyphs that have a name that exactly matches the query
6. Glyphs that have a name that contains each substring of the query As an example, in the case where the search input 202 indicates to search by Name 208a, the result configuration module 218 may configure a glyph search result as illustrated in FIG. 3, 4A, 4B, 5, 6A, or 6B as described below.

Figure 7:
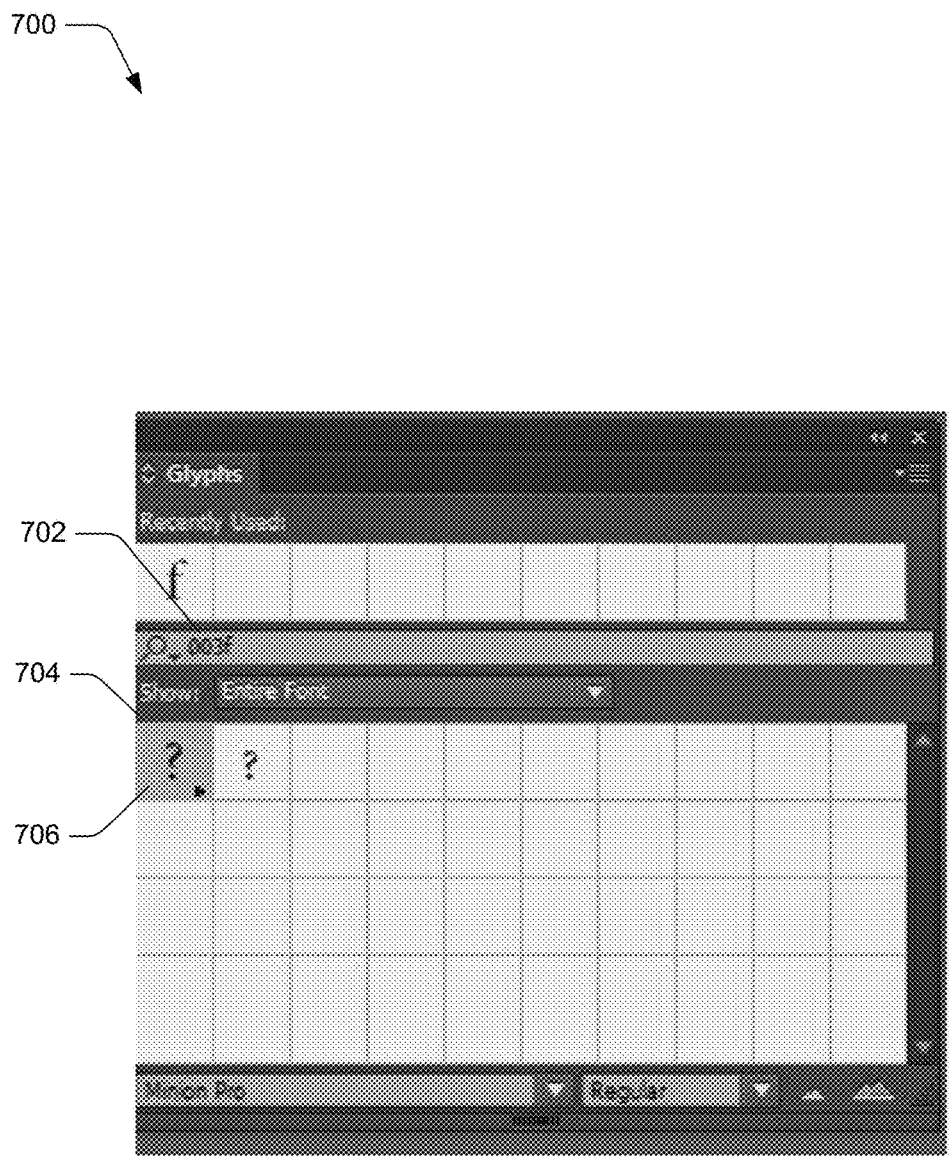
FIG. 7 depicts a display scenario with an end-user device showing an example glyph search result.
Figure 8:
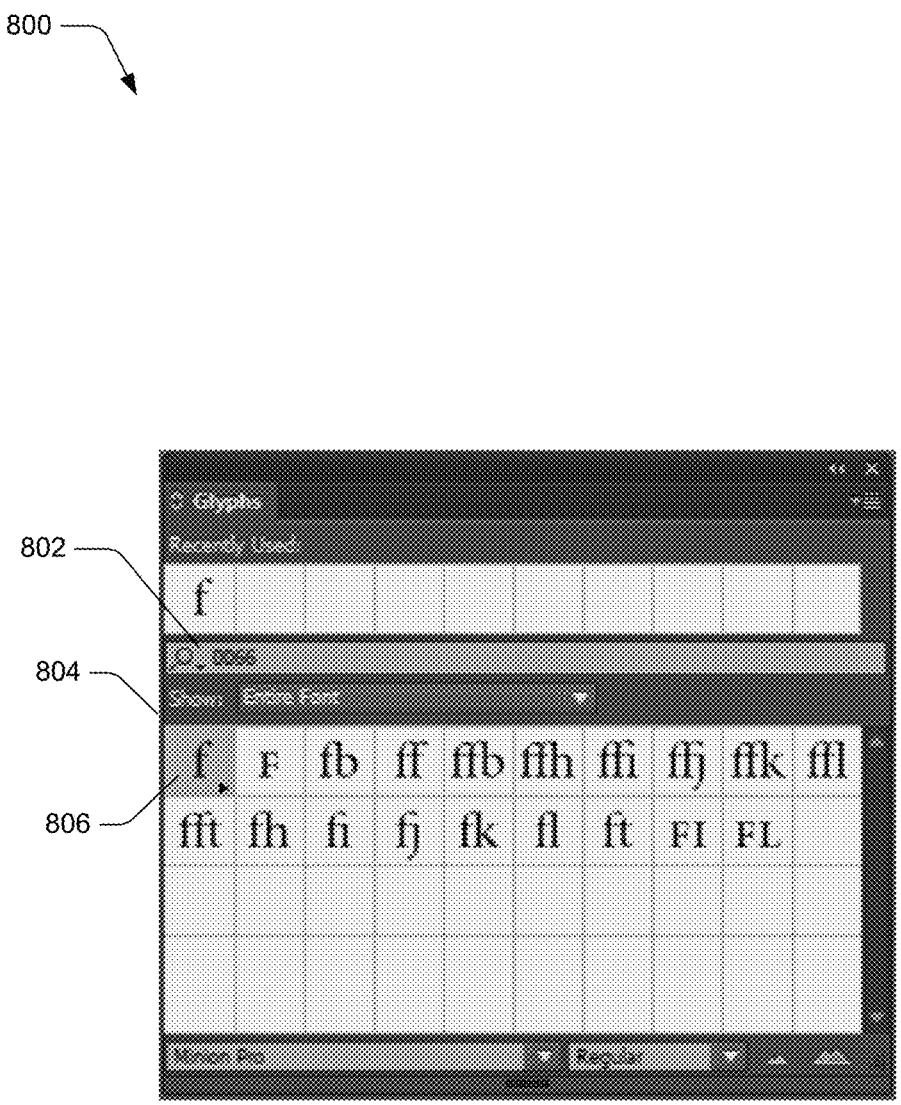
FIG. 8 depicts a display scenario with an end-user device showing an example glyph search result.

In the case where the search input 202 indicates to search by Unicode value 208b, the result configuration module 218 may configure the glyphs to display in the following order:
1. Glyphs that have the exact Unicode specified in the query
2. Ligature glyphs associated with the exact Unicode value specified in the query
3. Glyphs having a Unicode value that begins with the query, ordered from lowest to highest Unicode value As an example, in the case where the search input 202 indicates to search by Unicode value 208b, the result configuration module 218 may configure a glyph search result as illustrated in FIG. 7 or 8 as described below.

Figure 9:
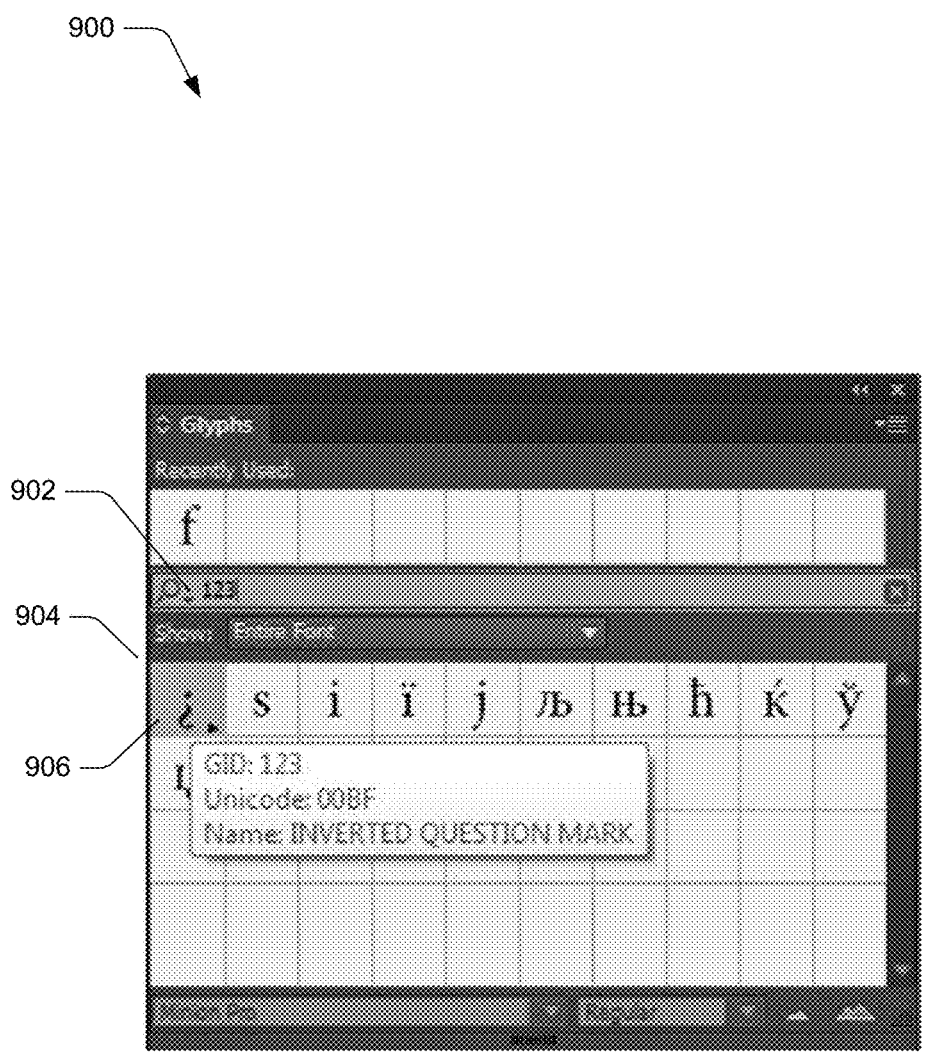
FIG. 9 depicts a display scenario with an end-user device showing an example glyph search result.

In the case where the search input 202 indicates to search by GID 208c or search by CID 208d, the result configuration module 218 may configure the glyphs to display in the following order:
1. Glyphs that have the exact GID/CID value, respectively, specified in the query
2. Glyphs having a GID/CID value, respectively, that begins with the query, ordered from lowest to highest GID/CID value As an example, in the case where the search input 202 indicates to search by GID 208c or search by CID 208d, the result configuration module 218 may configure a glyph search result as illustrated in FIG. 9 as described below.

Figure 10A:
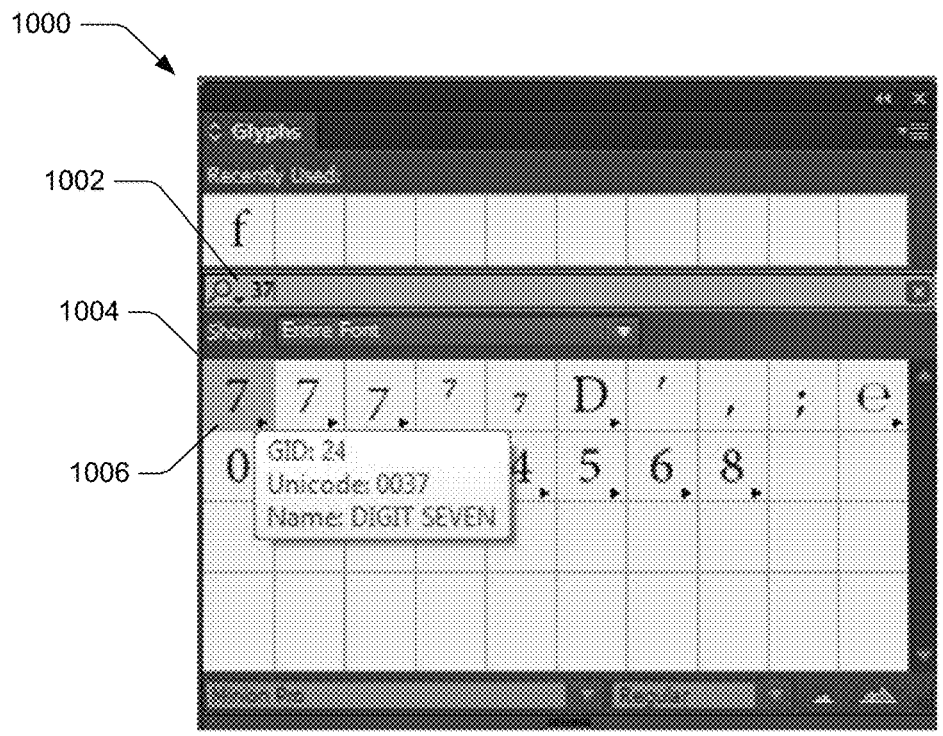
FIGS. 10A and 10B depict a display scenario with an end-user device showing an example glyph search result.
Figure 10B:
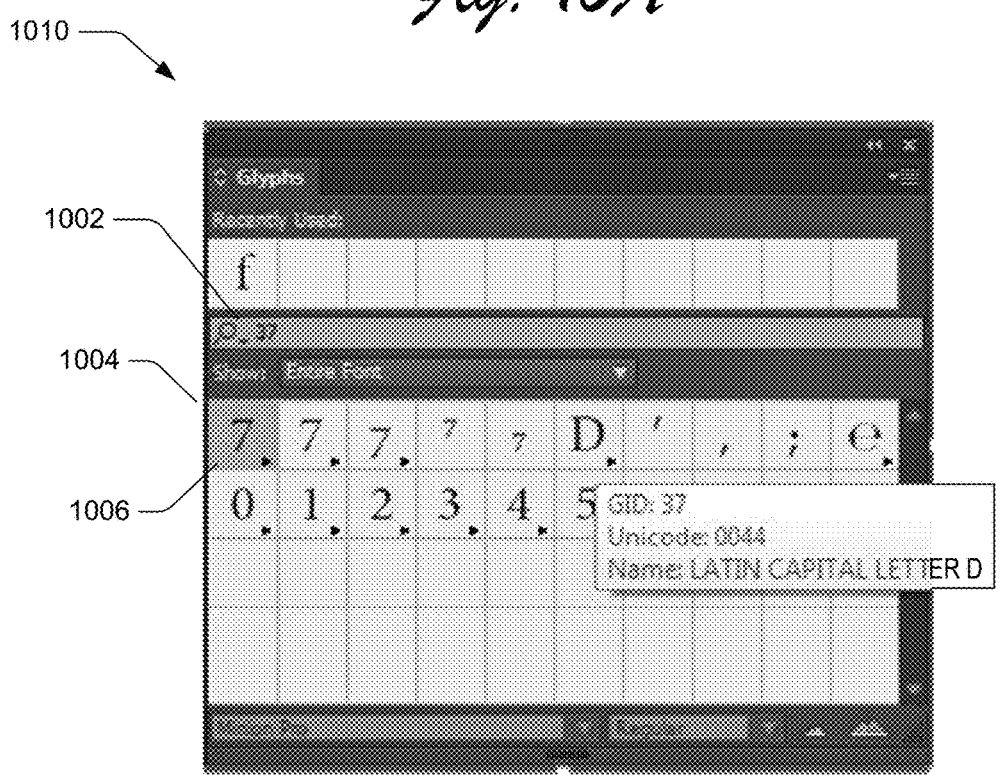

In the case where the search input 202 specifies to search by "all" or otherwise fails to specify a search type, the result configuration module 218 may configure the glyphs to display in the following order:
1. Glyphs that have a Unicode value that exactly matches the query
2. Glyphs that have a GID/CID value that exactly matches the query
3. Ligature glyphs associated with a Unicode value that exactly matches the query
4. Glyphs having a Unicode value that begins with the query, ordered from lowest to highest Unicode value
5. Glyphs having a GID/CID value that begins with the query, ordered from lowest to highest GID/CID value
6. Glyphs having a name value that exactly matches the query
7. Glyphs having a name value that contains each substring of the query As an example, in the case where the search input 202 indicates to search by "all" or otherwise fails to specify a search type, the result configuration module 218 may configure a glyph search result as illustrated in FIG. 10A or 10B as described below.

Thus, the result configuration module 218 may order the glyphs according to various rules. A variety of other rules and examples are also contemplated. Once the result configuration module 218 has ordered the glyphs, the configuration module 218 may configure the ordered glyphs in any manner suitable for output or display to create a glyph search result 220. The resultant glyph search result 220 is output to a user device and/or rendered in a user interface of the computing device 102. This process may continue (e.g., iterate) for successive search inputs 202 to follow a natural user flow of inputting a search query. For example, every time a character is added to or removed from the query, or the search input 202 is otherwise altered, the process may be performed and a series of glyph search results 220 may be output in real-time to a user.

FIGS. 3-10 each depict an example display scenario in which an end-user device shows an example glyph search result. The display scenarios 300, 400, 410, 500, 600, 610, 700, 800, 900, 100, and/or 1010, for example, may be the result of the scenario 200 of FIG. 2.

Figure 3:
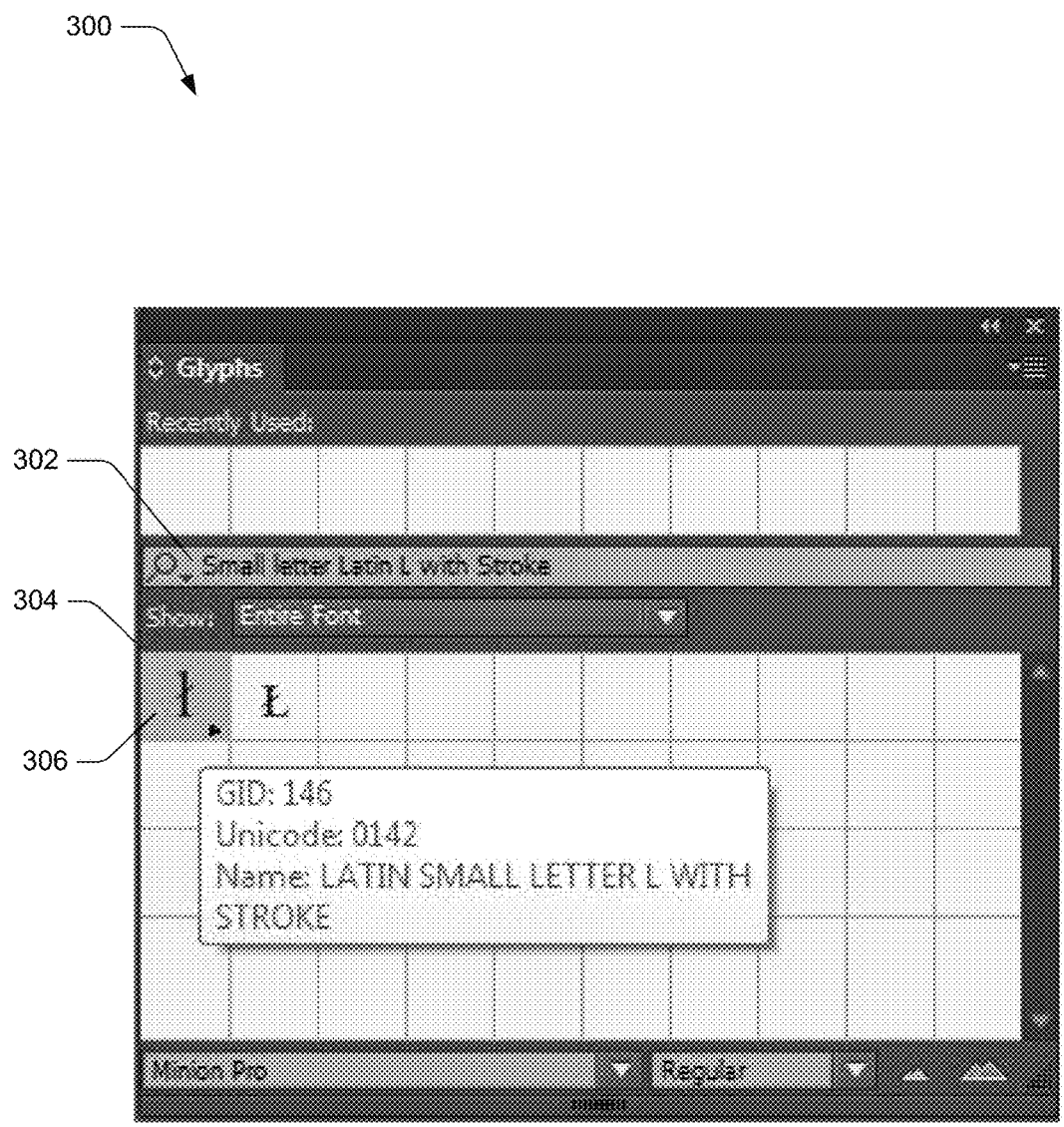
FIG. 3 depicts a display scenario with an end-user device showing an example glyph search result.

FIG. 3 depicts an example display scenario 300, and is illustrated with a query 302 and glyph search result 304 including various located glyphs 306. In this example, the query 302 "Small letter Latin L with Stroke" is entered in a search bar displayed above a glyph search result 304 within a user interface. The various located glyphs 306 include two glyphs, including a glyph with a GID of "146", a Unicode value of "0142", and a name of "Latin Small Letter L with Stroke." The glyph search result 304 may be, for instance, the glyph search result 220 of the scenario 200 of FIG. 2 in the case where the search input 202 indicates to search by Name 208a.

Figure 4A:
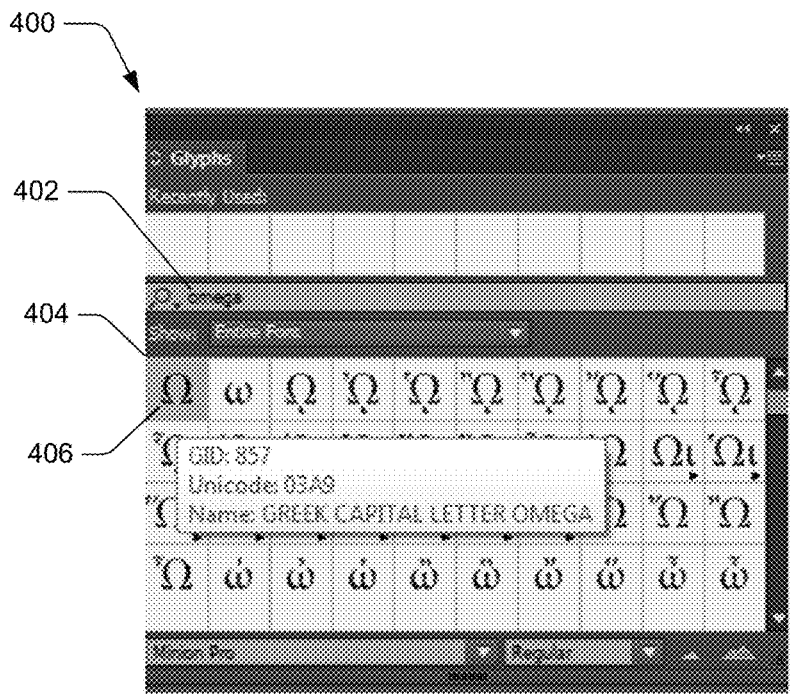
FIGS. 4A and 4B depict a display scenario with an end-user device showing an example glyph search result.
Figure 4B:
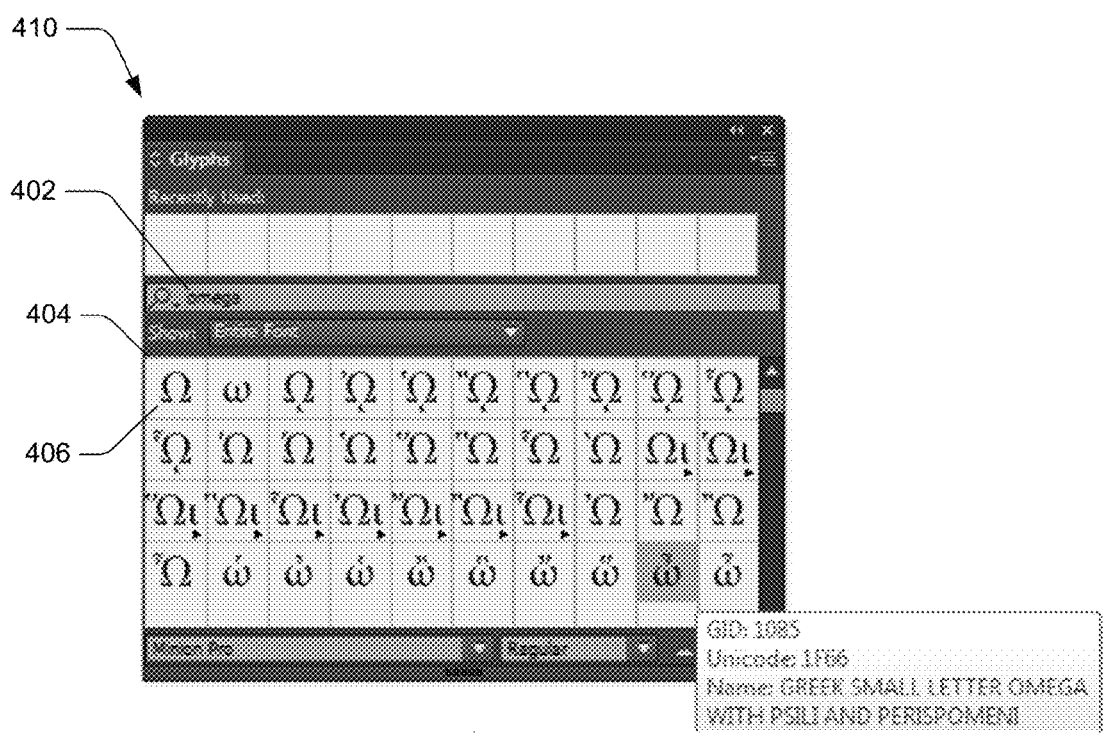

FIGS. 4A and 4B depict example display scenarios 400 and 410, respectively, and are illustrated with a query 402 and glyph search result 404 including various located glyphs 406. In these examples, the query 402 "omega" is entered in a search bar displayed above a glyph search result 404 within a user interface. The various located glyphs 406 include a variety of different glyphs, including a glyph with a GID of "857", a Unicode value of "03A9", and a name of "Greek Capital Letter Omega" as illustrated in FIG. 4A, and a glyph with a GID of "1085", a Unicode value of "1F66", and a name of "Greek Small Letter Omega With Psili and Perispomeni" as illustrated in FIG. 4B. The glyph search result 404 may be, for instance, the glyph search result 220 of the scenario 200 of FIG. 2 in the case where the search input 202 indicates to search by Name 208a.

Figure 5:
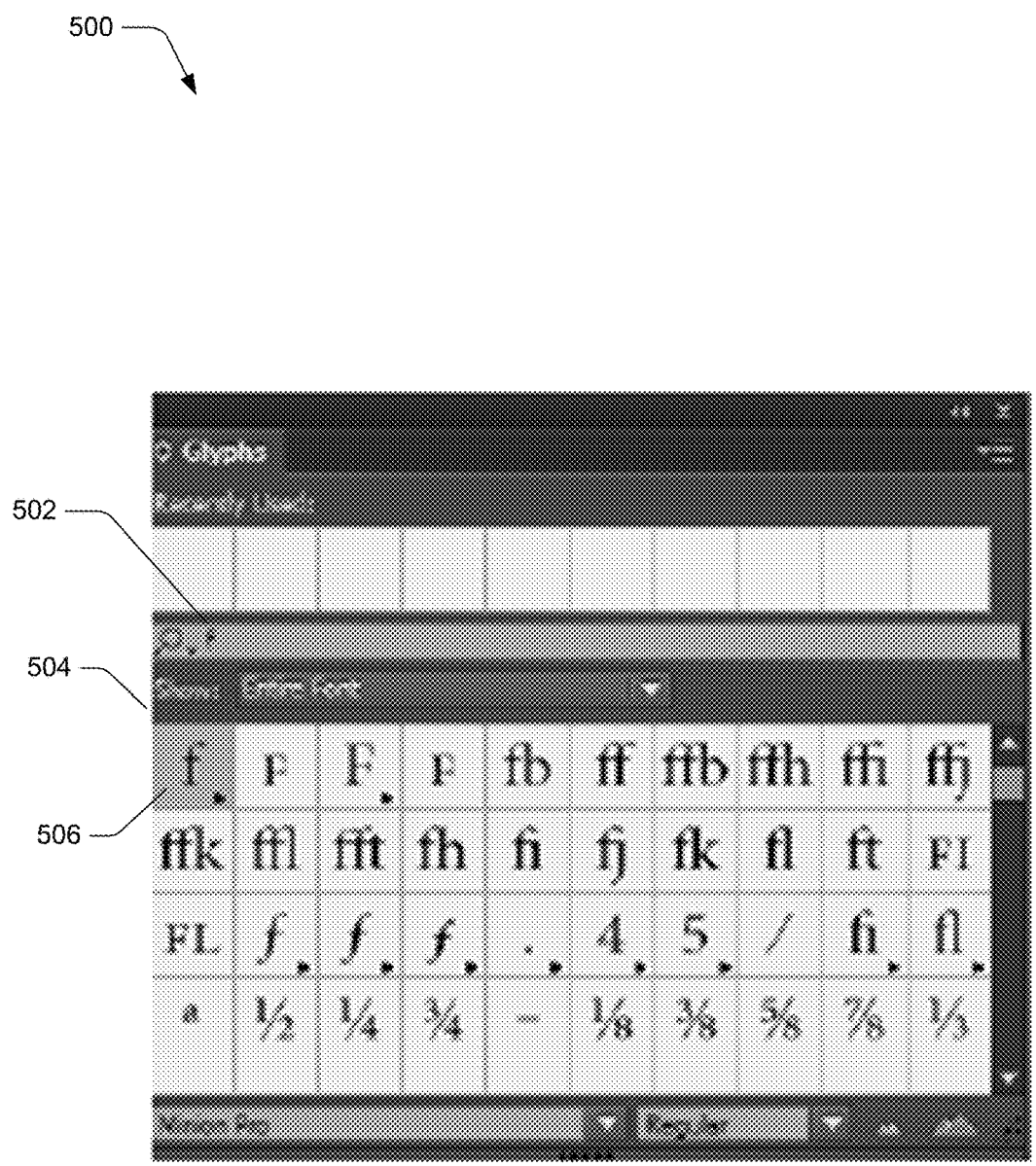
FIG. 5 depicts a display scenario with an end-user device showing an example glyph search result.

FIG. 5 depicts an example display scenario 500, and is illustrated with a query 502 and glyph search result 504 including various located glyphs 506. In this example, the query 502 "f" is entered in a search bar displayed above a glyph search result 504 within a user interface. The various located glyphs 506 include two glyphs of the letter "f", two glyphs of the letter "F", a variety of ligature glyphs that include the character "f", glyphs of the numbers "4" and "5" as their name values contain the letter "f", and a variety of fraction glyphs whose name values contain the letter "f". The glyph search result 504 may be, for instance, the glyph search result 220 of the scenario 200 of FIG. 2 in the case where the search input 202 indicates to search by Name 208*a*.

Figure 6A:
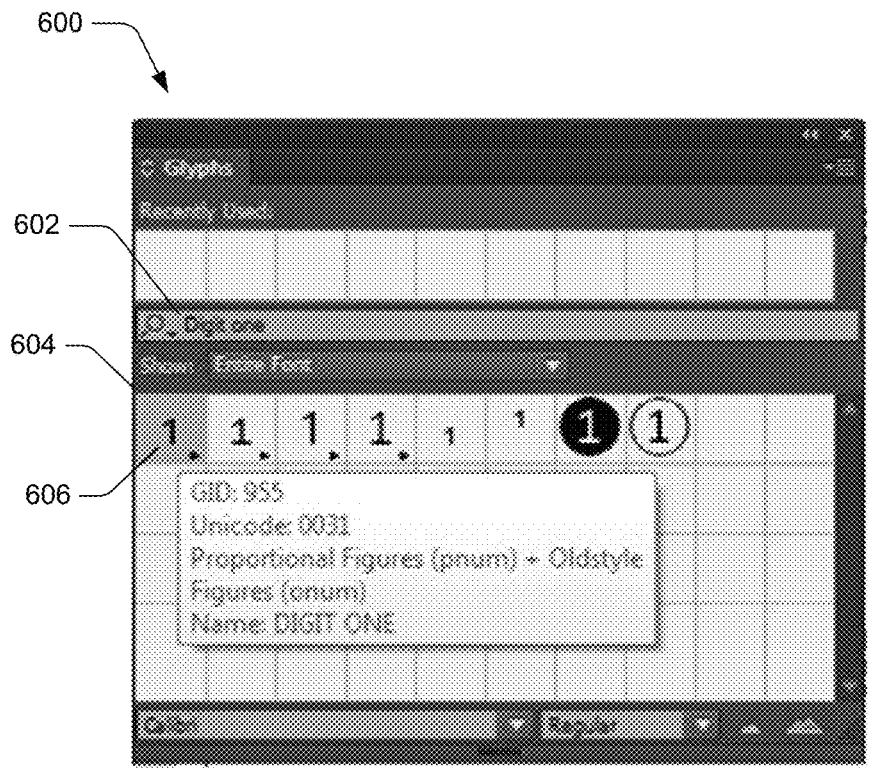
FIGS. 6A and 6B depict a display scenario with an end-user device showing an example glyph search result.
Figure 6B:
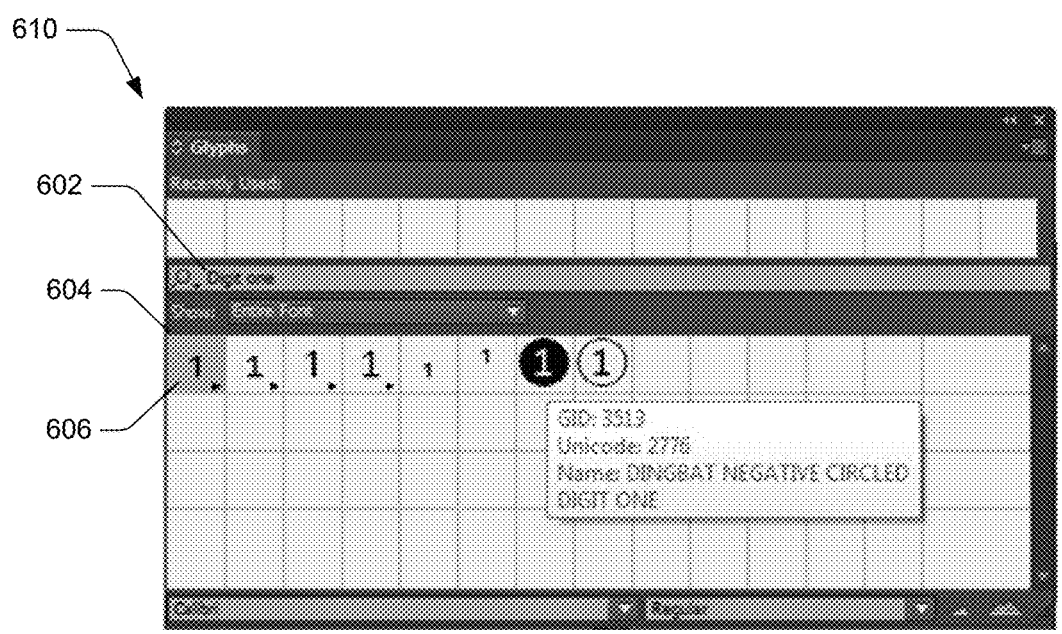

FIGS. 6A and 6B depict example display scenarios 600 and 610, respectively, and are illustrated with a query 602 and glyph search result 604 including various located glyphs 606. In these examples, the query 602 "Digit one" is entered in a search bar displayed above a glyph search result 604 within a user interface. The various located glyphs 606 include a variety of different glyphs, including a glyph with a GID of "955", a Unicode value of "0031", and a name of "Digit One" as illustrated in FIG. 6A, and a glyph with a GID of "3513", a Unicode value of "2776", and a name of "Dingbat Negative Circled Digit One" as illustrated in FIG. 6B. The glyph search result 604 may be, for instance, the glyph search result 220 of the scenario 200 of FIG. 2 in the case where the search input 202 indicates to search by Name 208*a*.

FIG. 7 depicts an example display scenario 700, and is illustrated with a query 702 and glyph search result 704 including various located glyphs 706. In this example, the query 702 "003f" is entered in a search bar displayed above a glyph search result 704 within a user interface. The various located glyphs 706 include two different glyphs that each have a Unicode value of "003f". The glyph search result 704 may be, for instance, the glyph search result 220 of the scenario 200 of FIG. 2 in the case where the search input 202 indicates to search by Unicode value 208*b*.

FIG. 8 depicts an example display scenario 800, and is illustrated with a query 802 and glyph search result 804 including various located glyphs 806. In this example, the query 802 "0066" is entered in a search bar displayed above a glyph search result 804 within a user interface. The various located glyphs 806 include a variety of different glyphs, including two glyphs that have a Unicode value of exactly "0066" and 17 different ligature glyphs which have a Unicode value that includes at least in part the value "0066". The glyph search result 804 may be, for instance, the glyph search result 220 of the scenario 200 of FIG. 2 in the case where the search input 202 indicates to search by Unicode value 208*b*.

FIG. 9 depicts an example display scenario 900, and is illustrated with a query 902 and glyph search result 904 including various located glyphs 906. In this example, the query 902 "123" is entered in a search bar displayed above a glyph search result 904 within a user interface. The various located glyphs 906 include a variety of different glyphs, including eleven different glyphs that have a GID or CID value that begins with the value "123", including a glyph with a GID of "123", a Unicode value of "00BF", and a name of "Inverted Question Mark". The glyph search result 904 may be, for instance, the glyph search result 220 of the scenario 200 of FIG. 2 in the case where the search input 202 indicates to search by GID 208*c* or search by CID 208*d*.

FIGS. 10A and 10B depict example display scenarios 1000 and 1010, respectively, and are illustrated with a query 1002 and glyph search result 1004 including various located glyphs 1006. In these examples, the query 1002 "37" is entered in a search bar displayed above a glyph search result 1004 within a user interface. The various located glyphs 1006 include a variety of different glyphs which have at least one of a Name value, GID value, CID value, or Unicode value that includes in at least in part "37". For example, the various located glyphs 1006 include a glyph with a GID of "24", a Unicode value of "0037", and a name of "Digit Seven" as illustrated in FIG. 10A, and a glyph with a GID of "37", a Unicode value of "0044", and a name of "Latin Capital Letter D" as illustrated in FIG. 10B. The glyph search result 1004 may be, for instance, the glyph search result 220 of the scenario 200 of FIG. 2 in the case where the search input 202 indicates to search by "all" or otherwise fails to specify a search type.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-3.

Figure 11:
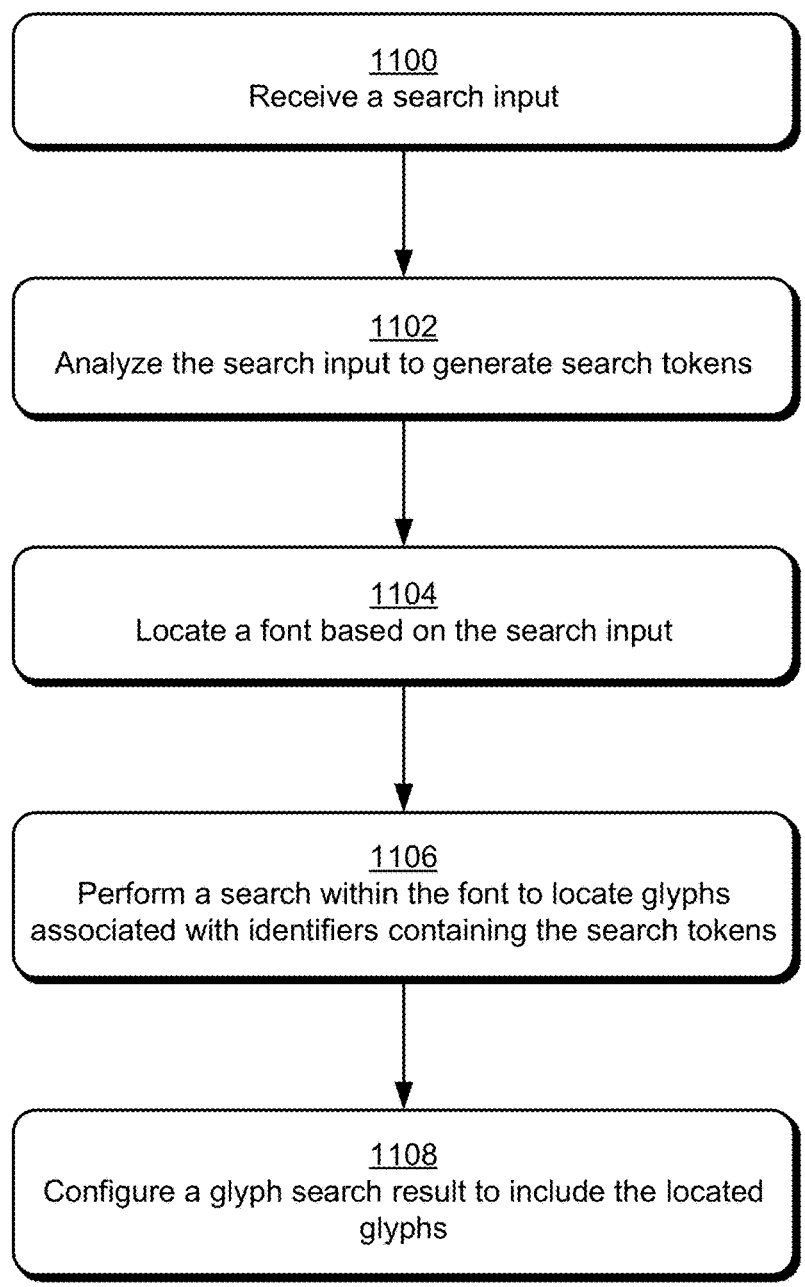
FIG. 11 is a flow diagram depicting a procedure in accordance with one or more embodiments.

FIG. 11 is a flow diagram depicting a procedure in an example embodiment in which a search input is received and analyzed to search a font to locate glyphs to be included in a glyph search result.

Step 1100 receives a search input. For example, the analyzing module 210 of the glyph search system 104 may receive the search input. The search input specifies a query, a font, and an indication of search type. The search input may be formed as a series of individual inputs from a user, and may additionally include inputs created by a computing device, such as the computing device 102. For example, an application may detect a font utilized within the application and make the detected font a default selection such that a user does not need to enter additional input regarding font if they wish to search the detected font. The inputs may originate in a variety of ways, such as detected using touchscreen functionality of a display device, use of a cursor control device or stylus, detected using a camera and without using touch as part of a natural user interface, use of a keyboard, and so forth.

Step 1102 analyzes the search input to generate search tokens. For example, the analyzing module 210 of the glyph search system 104 may analyze a received search input and generate search tokens. As described above with reference to the analyzing module 210 of FIG. 2 and below with respect to step 1200 of FIG. 12, any number of techniques may be utilized to analyze the search input, such as by parsing the input to generate a search token for each word. However, any suitable technique may be utilized and the method is not limited to parsing. For instance, an advanced user may be able to directly input particular search tokens.

Step 1104 locates a font based on the search input. For example, the searching module 212 of the glyph search system 104 may utilize a font indicated in the search input to locate a corresponding font within the font database 106. The font specified in the search input is identified, and the font is located. For instance, the search input may identify a specific file to be utilized. Locating the font may involve searching a local font database to locate the specified font, or may alternatively involve utilizing the network 108 to locate the font on an external device for access and/or download.

Step 1106 performs a search within the font to locate glyphs associated with identifiers containing the search tokens. For example, the searching module 212 of the glyph search system 104 may utilize the search tokens generated by the analyzing module 210 in order to perform a search within the located font 206. As described above with reference to the searching module 212 of FIG. 2 and below with respect to step 1212 of FIG. 12, any number of techniques may be utilized to search for glyphs within a font, such as by comparing search tokens to identifiers contained within the font. However, any suitable technique may be utilized, such as by utilizing a character to glyph index mapping table, and the method is not limited to comparing search tokens to identifiers.

Step 1108 configures a glyph search result to include the located glyphs. For example, the result configuration module 218 of the glyph search system 104 may utilize the located glyphs 214 to configure a glyph search result 220. A number of conditions and rules may determine an order in which to configure the located glyphs, as described above with reference to the result configuration module 218 of FIG. 2. For example, a set of rules may determine that an 'exact match' is displayed with a higher priority than a 'related match.' An exact match may be, for instance, a glyph associated with an identifier that is exactly the same as the search query. A related match may be, for instance, a glyph associated with an identifier that contains or begins with the search query, contains substrings of the search query as represented by search tokens of individual words, or is otherwise similar or related to the search query. The glyph search result is configured in a format that may be later output or displayed, such as via a user interface of an end-user computing device.

Figure 12:
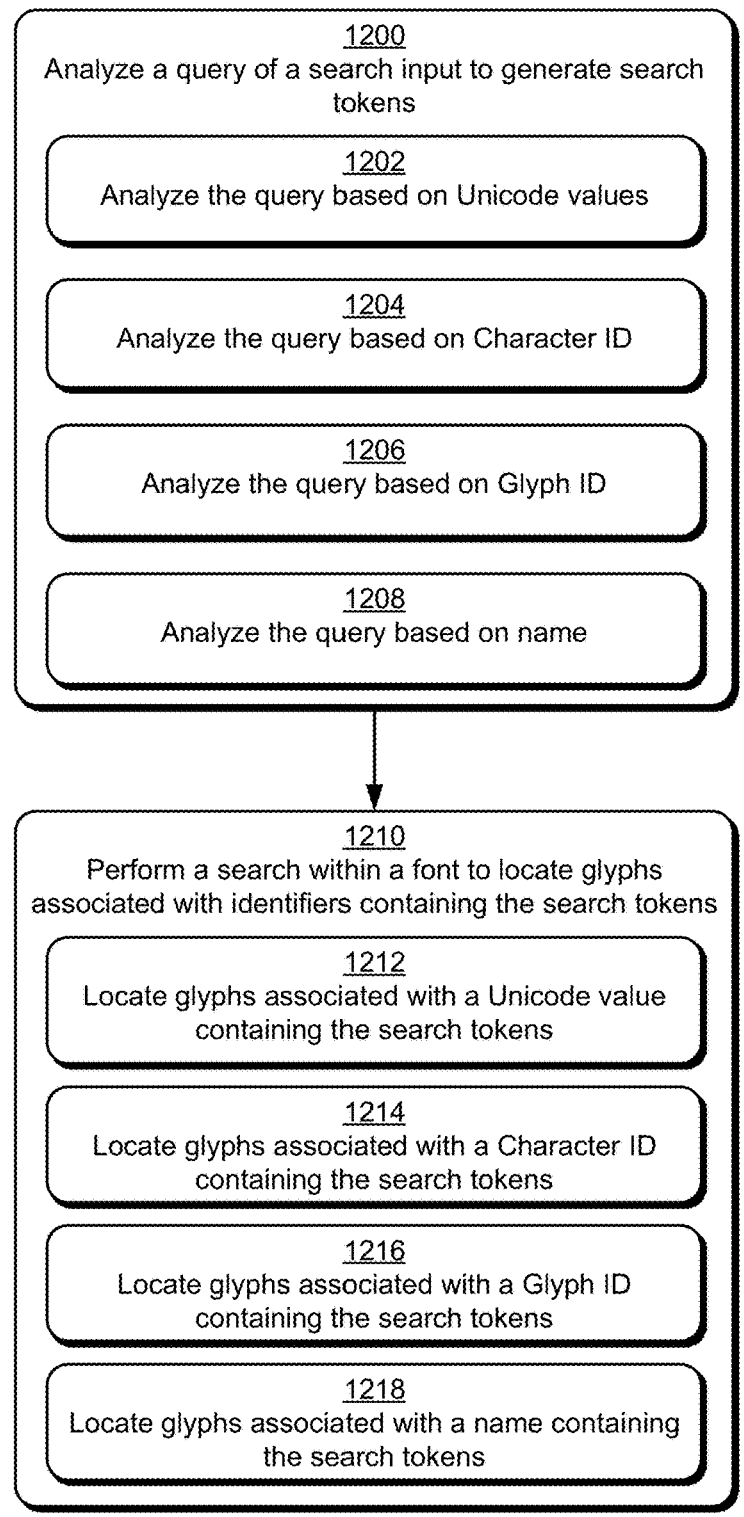
FIG. 12 is a flow diagram depicting a procedure in accordance with one or more embodiments.

FIG. 12 is a flow diagram depicting a procedure in an example embodiment in which a search input is received and analyzed to search a font to locate glyphs to be included in a glyph search result.

Step 1200 analyzes a query of a search input to generate search tokens. For example, the analyzing module 210 of the glyph search system 104 may analyze a search input and generate search tokens. The query may be analyzed in any suitable way, such as by analyzing the query based on Unicode values in step 1202, analyzing the query based on character ID in step 1204, analyzing the query based on glyph ID in step 1206, and/or analyzing the query based on name in step 1210. However, any suitable technique may be utilized and the method is not limited to these examples. For instance, analyzing the query of a search input may utilize a character to glyph index mapping table.

Step 1202 analyzes the query based on Unicode values. For example, the analyzing module 210 of the glyph search system 104 may analyze the query based on Unicode values. It is determined whether the query is a Unicode value or a portion of a Unicode value. For instance, a Unicode value is a hexadecimal number, and inputs that are at least a portion of a hexadecimal number considered a valid numerical input. If the query is a valid numerical input, a search token is created representing the number of the query. If the query is not a numerical input, the analyzing module may convert the input into a numerical input, such as by converting a text input into Unicode values of the text. The search token may consist of, for example, a string of Unicode values representing the query.

Step 1204 analyzes the query based on CID. For example, the analyzing module 210 of the glyph search system 104 may analyze the query based on CID values. It is determined whether the query is a CID value or a portion of a CID value. For instance, if CID values of the font are decimal values, inputs that cannot be at least a portion of a decimal number are rejected and no search tokens are created. If the query is a valid numerical input, a search token is created representing the number of the query. The search token may consist of, for example, a string of Unicode values representing the query.

Step 1206 analyzes the query based on GID. For example, the analyzing module 210 of the glyph search system 104 may analyze the query based on GID values. It is determined whether the query is a GID value or a portion of a GID value. For instance, if GID values of the font are decimal values, inputs that cannot be at least a portion of a decimal number are rejected and no search tokens are created. If the query is a valid numerical input, a search token is created representing the number of the query. The search token may consist of, for example, a string of Unicode values representing the query.

Step 1208 analyzes the query based on name. For example, the analyzing module 210 of the glyph search system 104 may analyze the query based on name values. A length of the query is determined. If the length of the query is one character, a search token is created of the character, and an additional search token is created for the alternate of the character. This may involve, for instance, creating search tokens comprising the respective Unicode values of the characters. If the text of the query is greater than one character, a search token is created for the entirety of the query, and additional search tokens are created corresponding to each individual word within the query.

Step 1210 performs a search within a font to locate glyphs associated with identifiers containing the search tokens. For example, the searching module 212 of the glyph search system 104 may utilize the search tokens generated by the analyzing module 210 in order to perform a search within the font 206. The font may be searched and glyphs may be located in any suitable way, such as by locating glyphs associated with a Unicode value containing the search tokens in step 1212, locating glyphs associated with a CID containing the search tokens in step 1214, locating glyphs associated with a GID containing the search tokens in step 1216, and/or locating glyphs associated with a name containing the search tokens in step 1218. However, any suitable technique may be utilized, such as by locating glyphs associated with Association for Font Information Interchange (AFII) identification numbers, and the method is not limited to these examples.

Step 1212 locates glyphs associated with a Unicode value containing the search tokens. For example, the searching module 212 of the glyph search system 104 may utilize the search tokens generated in step 1202 in order to perform a search of Unicode values within the font 206. The search tokens are compared against the value of each Unicode identifier contained within the font. The Unicode identifiers are searched for values that begin with the search tokens. For example, the Unicode identifiers may be searched according to the following criteria:

$$(\text{Unicode identifier})/(16^k)=x$$

where the search token is 'x' and 'k' is an integer value greater than 0. Once eligible Unicode identifiers are located, the located Unicode identifiers are utilized to locate corresponding glyphs, and the corresponding glyphs are retrieved.

Step 1214 locates glyphs associated with a CID containing the search tokens. For example, the searching module 212 of the glyph search system 104 may utilize the search tokens generated in step 1204 in order to perform a search of CID values within the font 206. The search tokens are compared against the value of each CID identifier contained within the font. The CID identifiers are searched for values that begin with the search tokens. For example, the CID identifiers may be searched according to the following criteria:

$$(\text{CID identifier})/(10^k)=x$$

where the search token is 'x' and 'k' is an integer value greater than 0 Once eligible CID identifiers are located, the located CID identifiers are utilized to locate corresponding glyphs, and the corresponding glyphs are retrieved.

Step 1216 locates glyphs associated with a GID containing the searching tokens. For example, the searching module 212 of the glyph search system 104 may utilize the search tokens generated in step 1206 in order to perform a search of GID values within the font 206. The search tokens are compared against the value of each GID identifier contained within the font. The GID identifiers are searched for values that begin with the search tokens. For example, the GID identifiers may be searched according to the following criteria:

$$(\text{GID identifier})/(10^k)=x$$

where the search token is 'x' and 'k' is an integer value greater than 0 Once eligible GID identifiers are located, the located GID identifiers are utilized to locate corresponding glyphs, and the corresponding glyphs are retrieved.

Step 1218 locates glyphs associated with a name containing the search tokens. For example, the searching module 212 of the glyph search system 104 may utilize the search tokens generated in step 1208 in order to perform a search of name values within the font 206. The search tokens are compared against the value of each name identifier contained within the font. The name identifiers are searched for inclusion of the value of the search tokens comprising the entirety of the query. Further, the name identifiers are searched for inclusion of the values of each search token comprising a separate word of the query. Once eligible name identifiers are located, the located name identifiers are utilized to locate corresponding glyphs, and the corresponding glyphs are retrieved.

Having discussed some example procedures, consider now a discussion of an example system and device in accordance with one or more embodiments.

Example System and Device

Figure 13:
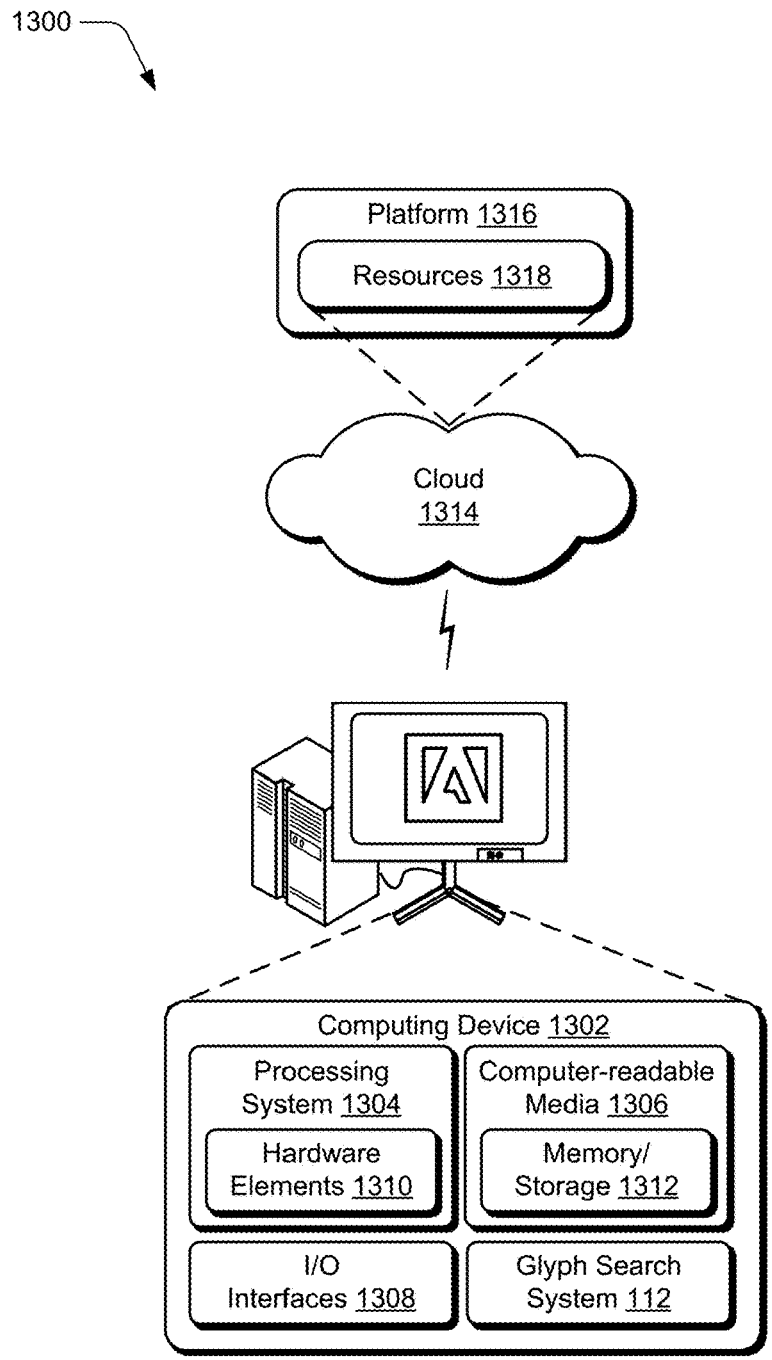
FIG. 13 illustrates an example system including various components of an example device that can be implemented as any type of computing device as described and/or utilize with reference to FIGS. 1-5 to implement embodiments of the techniques described herein.

FIG. 13 illustrates an example system generally at 1300 that includes an example computing device 1302 that is representative of one or more computing systems and/or devices that may implement the various techniques described herein. This is illustrated through inclusion of the glyph search system 112. The computing device 1302 may be, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interface 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include embodiment in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An embodiment of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other embodiments in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, embodiment of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

The techniques described herein may be supported by various configurations of the computing device 1302 and are not limited to the specific examples of the techniques described herein. This functionality may also be implemented all or in part through use of a distributed system, such as over a "cloud" 1314 via a platform 1316 as described below.

The cloud 1314 includes and/or is representative of a platform 1316 for resources 1318. The platform 616 abstracts underlying functionality of hardware (e.g., servers) and software resources of the cloud 1314. The resources 1318 may include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 may abstract resources and functions to connect the computing device 1302 with other computing devices. The platform 1316 may also serve to abstract scaling of resources to provide a corresponding level of scale to encountered demand for the resources 1318 that are implemented via the platform 1316. Accordingly, in an interconnected device embodiment, embodiment of functionality described herein may be distributed throughout the system 1300. For example, the functionality may be implemented in part on the computing device 1302 as well as via the platform 1316 that abstracts the functionality of the cloud 1314.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A method comprising:
receiving, by one or more computing devices, a user input from a user for locating a glyph, the user input specifying a query;
analyzing, by the one or more computing devices, the query to generate one or more search tokens;
identifying, by the one or more computing devices, a font indicated by the user input;
identifying, by the one or more computing devices, a plurality of glyphs contained within the font and a plurality of identifiers contained within the font, each of the plurality of glyphs associated with at least one of the plurality of identifiers;
performing, by the one or more computing devices, a search within the font to locate one or more identifiers of the plurality of identifiers, the one or more identifiers containing at least one of the one or more search tokens;
performing, by the one or more computing devices, a search within the font to locate one or more glyphs of the plurality of glyphs, the one or more glyphs associated with the located identifiers;
configuring, by the one or more computing devices, a glyph search result to include the located glyphs; and
outputting, by the one or more computing devices, the glyph search result within a user interface, the glyph search result configured to display the located glyphs as candidates for placement in a document by the user.

2. The method of claim 1, wherein the plurality of identifiers include glyph identification values, character identification values, Unicode values, and name values.

3. The method of claim 1, wherein the plurality of identifiers include character identification values, and the located identifiers comprise character identification values.

4. The method of claim 1, wherein the plurality of identifiers include glyph identification values, and the located identifiers comprises glyph identification values.

5. The method of claim 1, wherein the plurality of identifiers include Unicode values, and the located identifiers comprise a Unicode value.

6. The method of claim 1, wherein the query comprises a plurality of words, the analyzing comprises generating a search token for each of the respective words, and the located identifiers contain at least each of the search tokens.

7. The method of claim 1, wherein the analyzing comprises generating at least one search token comprising text of the query and at least one search token comprising Unicode values corresponding to the text of the query, the plurality of identifiers include at least Unicode values and names, and the one or more glyphs comprise at least one glyph associated with an identifier containing the at least one search token comprising text of the query and at least one glyph associated with an identifier containing the at least one search token comprising Unicode values.

8. The method of claim 1, wherein the query comprises one or more numbers, and the located identifiers begin with the one or more numbers.

9. In a digital media environment to facilitate creation of content using one or more computing devices, a system, comprising:
an analyzing module implemented at least partially in hardware of a computing device, the analyzing module configured to:
analyze a query specified in a search input from a user to generate one or more search tokens;
identify a font indicated by the search input; and
identify a plurality of glyphs contained within the font and a plurality of identifiers contained within the font, each of the plurality of glyphs associated with at least one of the plurality of identifiers;
a searching module implemented at least partially in hardware of a computing device, the searching module configured to:
locate one or more identifiers of the plurality of identifiers, the one or more identifiers containing at least the one or more search tokens; and
locate one or more glyphs associated with the located identifiers; and
a result configuration module implemented at least partially in hardware of a computing device, the result configuration module configured to configure a glyph search result for display within a user interface to include the located glyphs as candidates for placement in a document by the user.

10. The system of claim 9, wherein the plurality of identifiers include glyph identification values, character identification values, Unicode values, and name values.

11. The system of claim 9, wherein the plurality of identifiers include character identification values, and the located identifiers comprise character identification values.

12. The system of claim 9, wherein the plurality of identifiers include glyph identification values, and the located identifiers comprises glyph identification values.

13. The system of claim 9, wherein the plurality of identifiers include Unicode values, and the located identifiers comprise a Unicode value.

14. The system of claim 9, wherein the query comprises a plurality of words, the analyzing comprises generating a search token for each of the respective words, and the located identifiers contain at least each of the search tokens.

15. The system of claim 9, wherein the analyzing comprises generating at least one search token comprising text of the query and at least one search token comprising Unicode values corresponding to the text of the query, the plurality of identifiers include at least Unicode values and names, and the one or more glyphs comprise at least one glyph associated with an identifier containing the at least one search token comprising text of the query and at least one glyph associated with an identifier containing the at least one search token comprising Unicode values.

16. The system of claim 9, wherein the query comprises one or more numbers, and the located identifiers begin with the one or more numbers.

17. A method comprising:
exposing functionality for creation of a document via a user interface for a digital media application;
conducting a search for glyphs related to a search input from a user specifying a query, by:
analyzing the query to generate one or more search tokens;
identifying from the search input a font usable by the digital media application and including a plurality of glyphs and a plurality of identifiers, each of the plurality of glyphs associated with at least one of the plurality of identifiers;
locating one or more identifiers of the plurality of identifiers, the one or more identifiers containing at least one of the one or more search tokens; and
locating one or more glyphs associated with an identifier containing at least one of the one or more search tokens; and
outputting the located glyphs as candidates for placement in the document by the user.

18. The method of claim 17, wherein the plurality of identifiers include glyph identification values, character identification values, Unicode values, and name values.

19. The method of claim 17, wherein the plurality of identifiers include character identification values, and the located identifiers comprise character identification values.

20. The method of claim 17, wherein the plurality of identifiers include glyph identification values, and the located identifiers comprises glyph identification values.

* * * * *